United States Patent [19]

Steber

[11] 4,422,288
[45] Dec. 27, 1983

[54] AFT MOUNTING SYSTEM FOR COMBUSTION TRANSITION DUCT MEMBERS

[75] Inventor: Charles E. Steber, Scotia, N.Y.

[73] Assignee: General Electric Company, Schenectady, N.Y.

[21] Appl. No.: 239,437

[22] Filed: Mar. 2, 1981

[51] Int. Cl.³ ............................................. F02C 7/20
[52] U.S. Cl. .................. 60/39.32; 60/39.37; 60/752
[58] Field of Search ............... 60/39.37, 39.32, 39.31, 60/261, 752; 248/55, 65, 58, 571

[56] References Cited

U.S. PATENT DOCUMENTS

| | | | |
|---|---|---|---|
| 2,509,503 | 5/1950 | Huyton | 60/39.31 |
| 2,511,432 | 6/1950 | Feilden . | |
| 2,529,958 | 11/1950 | Owner et al. . | |
| 2,547,619 | 4/1951 | Buckland . | |
| 3,007,312 | 11/1961 | Shutts . | |
| 3,232,054 | 2/1966 | Jackson et al. | 60/39.31 |
| 3,481,146 | 12/1969 | Jackson et al. | 60/39.32 |
| 3,572,029 | 3/1971 | Swift et al. | 60/39.32 |
| 3,609,968 | 10/1971 | Mierley et al. . | |
| 3,741,678 | 6/1973 | Arlington et al. . | |
| 3,750,398 | 8/1973 | Adelizyi | 60/39.37 |
| 3,759,038 | 9/1973 | Scalzo et al. | 60/39.32 |
| 4,016,718 | 4/1977 | Lauck | 60/39.32 |
| 4,297,843 | 11/1981 | Kato et al. | 60/39.32 |

Primary Examiner—Robert E. Garrett
Attorney, Agent, or Firm—J. C. Squillaro

[57] ABSTRACT

A structural support system for the aft end of advanced design combustion transition duct members of specially configured to withstand high temperature gradients and mechanical loads developed in heavy-duty cannular gas turbine combustion systems. A composite element support system is provided for each transition duct member wherein one end of a cylindrical base element is contoured for and welded to the outer wall of its associated transition duct member, while its other end carries a hinge joint of special design to interconnect the transition duct member to a desired mounting member. The circular footprint of the cylindrical base element on the transition duct member wall is configured to minimize thermal and mechanical stresses especially in the weld joint region, while the hinge joint allows relative movement of the connected parts about a desired axis. Additionally, a hinge joint through bolt is torqued to a predetermined value to dampen out unwanted mechanical vibrations.

18 Claims, 5 Drawing Figures

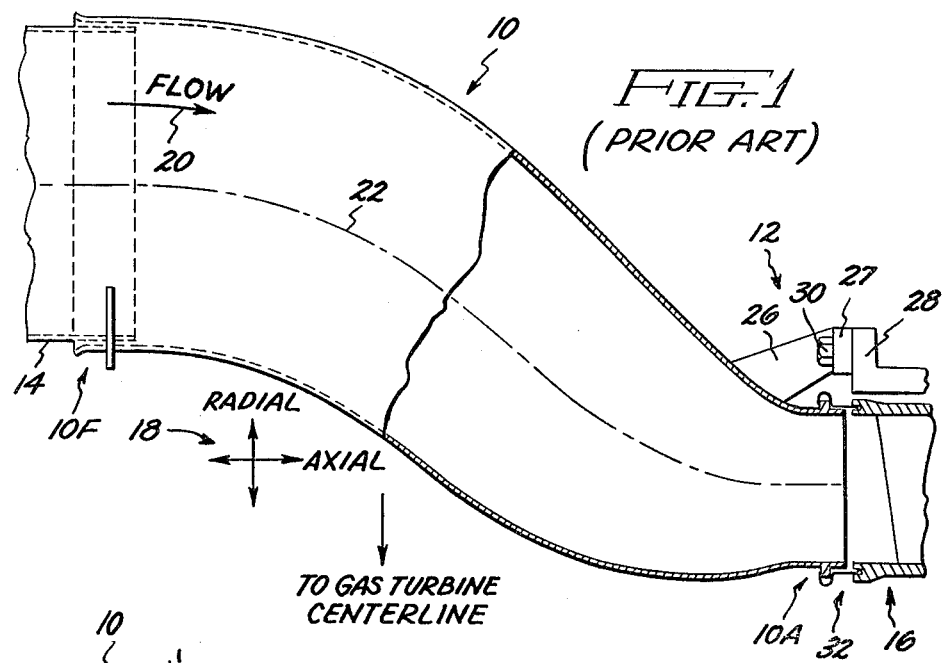
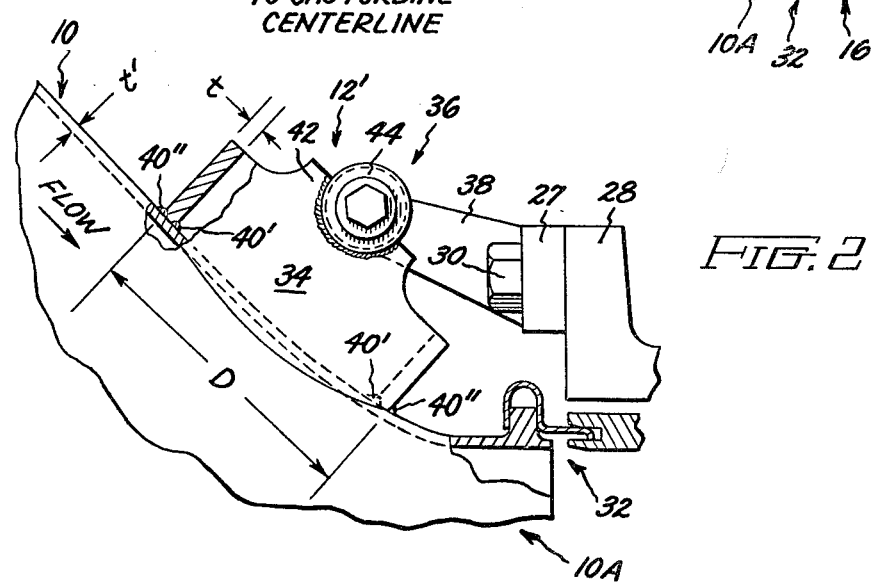
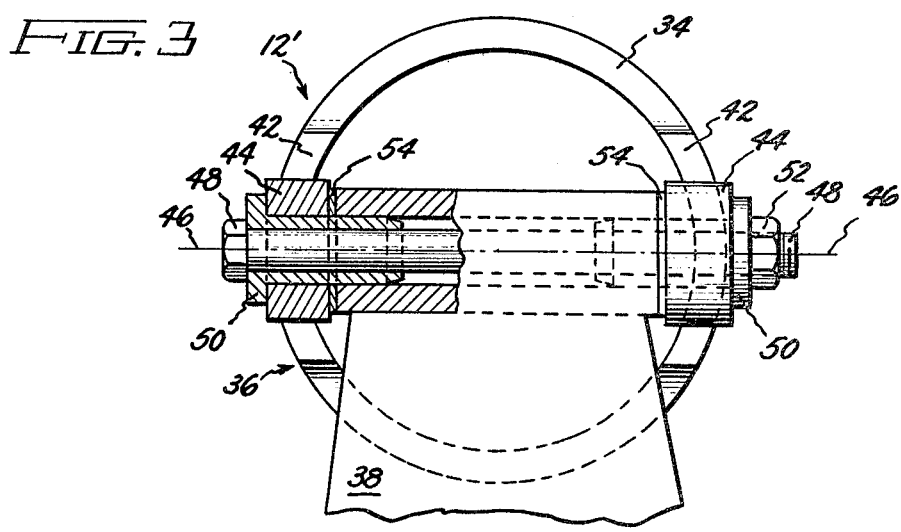

AFT MOUNTING SYSTEM FOR COMBUSTION TRANSITION DUCT MEMBERS

BACKGROUND OF THE INVENTION

1. Field of the Invention

The present invention relates generally to structural support systems in which high thermal gradients combine with high mechanical loads to potentially produce unacceptably high stress levels. In particular, the invention deals with the aft mounting system for transition duct members of cannular gas turbine combustion systems of advanced design. More specifically, the invention deals with the means of firmly attaching the transition duct member walls to structural members of the gas turbine without causing thermal or mechanical stresses in excess of those allowed by the materials.

2. Description of the Prior Art

In recent years advanced design gas turbine machines have been introduced to operate at increased turbine cycle temperatures to meet ever increasing load and efficiency requirements. These higher temperatures have combined with increased mechanical and aerodynamic loading to significantly increase the problems in obtaining long reliable life for those components directly subjected to the hot gas temperatures. In particular, in heavy duty gas turbines with cannular type combustion systems the transition duct members hereafter referred to as transition ducts or ducts, operate with wall temperatures approaching 1500° F. while the surrounding machine structure and compressor discharge air is only at about 650° F. This temperature difference tends to produce high thermal stresses particularly at the duct wall-to-support structure interfaces. Additional environmental factors such as combustion instability, machine vibration, buffeting due to external air flow, and the relatively high weight of the transition ducts impose large mechanical loads and resultant stresses in the aforementioned interface region between the duct wall and support structures.

The principal support for transition ducts in heavy-duty gas turbine combustion systems of the cannular type is at the aft (downstream) end of the ducts, just ahead of the first stage turbine nozzle. Axial, radial, circumferential, and torsional support are all required at the aft end. Conventionally, the required support has been provided by a series of flat plate gussets welded approximately perpendicular to the transition duct member outer wall, and then welded to a base plate which is in turn bolted to the first stage nozzle retaining ring structure. As turbine inlet temperatures have risen, it has been suggested to provide means to cool the transition duct wall-to-gusset joint to extend the capabilities of this simple, relatively inexpensive, support system. Such cooling has limited mitigating effects on the basic shortcomings of this support system.

Known support systems experience significant shortcomings due to concentrations of both mechanical and thermal stresses at the welded joint between the gusset(s) and the transition duct wall, particularly at the ends of this joint. The stresses result from the basic geometry of the interface. In addition, these high stresses occur where the material properties have been degraded by the weld process itself.

A further disadvantage of prior art systems is in the forward end to aft end radial support redundancy. Because of thermal growth differences and manufacturing tolerance stack-up between the forward and aft ends of the transition duct, there are additional built-in assembly and operational stresses to the forward and aft end support systems which further contribute to the low operational lifetimes for the effected parts.

A typical prior art gusset mount at the aft end of a gas turbine transition duct member is shown in U.S. Pat. No. 3,750,398 to Adelizzi. Therein, simple brackets (one for each transition duct) are secured by welding to the aft end of the transition duct, and are affixed by bolting to the machine inner casing. A somewhat similar weld-/bolt transition duct member support is disclosed in U.S. Pat. No. 3,609,968 to Mierley, Sr., et al.

Prior patents showing the use of pivoting mounting devices to support aft portions of transition duct members include U.S. Pat. Nos. 3,481,146 to Jackson et al; 2,547,619 to Buckland; 2,529,958 to Owner et al; and 2,511,432 to Feilden. These patents are directed to providing retaining means which permit compensation for thermally induced displacements along various axes and generally recognize the need for avoiding excessive rigidity in combustion support systems.

SUMMARY OF THE INVENTION

It is the general object of this invention to provide an improved structural support system for use in environments where high temperature differentials and mechanical loads are encountered as in heavy-duty gas turbine combustion systems.

A further object of this invention is to provide an improved aft mounting system for combustion transition ducts capable of withstanding the combined high temperature gradients and mechanical loads encountered in heavy duty gas turbine cannular type combustion systems in order to achieve long reliable operation from said components.

Another object of this invention is to improve and reduce the thermal stress distribution in the duct wall-to-support interface region of a transition duct of a cannular type gas turbine combustion system by utilizing an "endless" interface joint thereby eliminating the end effect problems of present support systems.

Yet another object of this invention is to minimize thermal stresses in the aft mount region of a combustion transition duct by utilizing a cylindrical base support system wherein one end of a hollow cylinder is contoured to the duct wall curvature and yields a fundamentally circular interface joint thereby eliminating stress concentrations due to regions of discontinuity.

A still further object of the invention is to redistribute thermal stresses in the aft mount region of a combustion transition duct according to permissible levels established by operating metal temperature and material properties by utilizing a cylindrical base support system of selected wall thickness to reduce stresses in the hot duct wall and especially at the cylindrical base-to-duct wall weld joint relative to regions on the cylinder away from the duct wall where lower temperature permit higher stresses.

Another object of this invention is to reduce stresses in the duct wall and duct wall-to-support structure interface due to steady state and vibratory mechanical loads by providing a relatively large, endless, circular footprint on the duct wall thereby eliminating stress concentrations and maximizing structural stiffness.

Still another object of this invention is to eliminate combustion transition duct support system redundancy by providing a hinge joint in the aft support system which allows the desired degree of freedom between the forward and aft ends of said transition duct.

A final object of this invention is to provide a combined hinge joint and cylindrical base aft mounting system for combustion transition ducts wherein unwanted mechanical vibrations and resultant wear is prevented by providing a predetermined friction damping of the hinge action while continuing to permit movements required by manufacturing tolerances and thermal growths of the gas turbine structures at the forward and aft ends of said transition ducts.

In a preferred embodiment of the present invention, there is provided a structural support system for the aft end of a transition duct of a cannular type gas turbine combustion system. A cylindrical base member of selected wall thickness is contoured and welded at one end of the cylinder to the radially outboard wall of the corresponding transition duct thereby providing a rigid, low stress attachment to the duct wall. The other end of the cylinder carries a hinge joint permitting attachment to a mounting bracket affixed to the nozzle retaining ring thereby enabling movement about a desired axis. The hinge joint action is damped to a predetermined degree by torquing a through bolt thereby preventing unwanted mechanical vibrations and resultant wear while allowing stress relieving movements.

BRIEF DESCRIPTION OF THE DRAWINGS

Additional objects and advantages of the invention will become apparent to those skilled in the art as the description proceeds with reference to the accompanying drawings wherein:

FIG. 1 is a side-elevation view of a combustion transition duct having a basic aft supporting means of known type;

FIG. 2 is a fragmentary side-elevation view, partly in section, of the combustion transition duct of FIG. 1 showing the aft mounting system according to the present invention;

FIG. 3 is a plan view, partly in section, showing the details of the hinge joint assembly in accordance with the present invention;

DETAILED DESCRIPTION OF THE PREFERRED EMBODIMENTS

Figure 4:
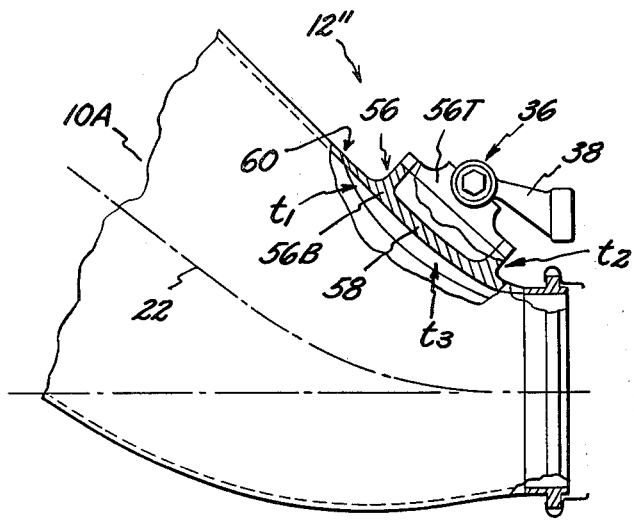
FIG. 4 is a fragmentary side-elevation view, partly in section, of the transition duct member of FIG. 2 showing an alternate embodiment of the cylindrical joint member attached to the duct wall.

Referring now to FIG. 1 there is shown a side-elevation of a combustion transition duct 10 having an aft supporting means of known type shown generally at 12. The transition duct 10 is one of a plurality of transition duct members arranged in an annular array as is well-known in heavy-duty gas turbines combustion systems of the cannular type as shown for example in U.S. Pat. No. 3,759,038. In overall configuration, the transition duct member 10 is cylindrical in shape at its forward (upstream) end 10F, where it couples to its corresponding combustion liner portion 14 (partially shown); and thereafter transitions to an annular sector shape at its aft (downstream) end 10A, where it couples into the first stage turbine nozzle, shown generally at 16.

A coordinate system referenced to the center line, or major axis, of the gas turbine is shown generally at 18 having a radial axis vertically disposed with respect to the plane of the paper, an axial axis horizontally disposed, and a circumferential axis (not shown) directed into the plane of the paper. The direction of hot gas flow is indicated by the flow arrow 20, and a central axis along a plane of symmetry of the transition duct member 10 is shown as the broken line 22. For the view of the transition duct member 10 as shown, the gas turbine centerline (not shown, but oriented along its rotating shaft) is horizontally disposed and displaced from member 10 as shown by the arrow 24.

Figure 5:
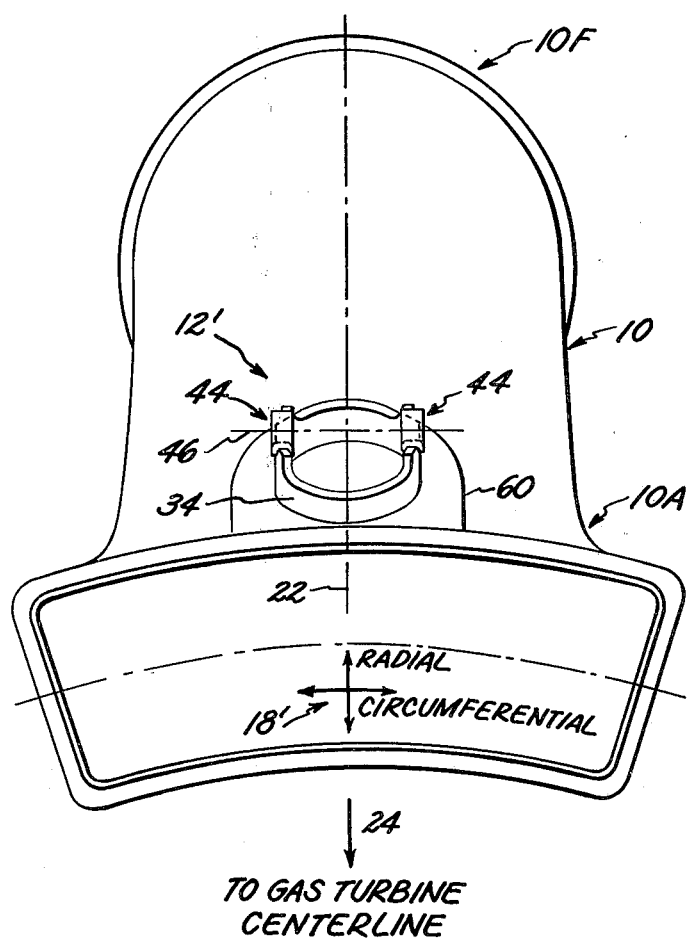
FIG. 5 is a rear perspective view of the transition duct member of the present invention showing details of the unassembled hinge joint assembly.

Referring momentarily to FIG. 5, there is shown a perspective view (looking upstream) of an illustrative embodiment of the combustion transition duct 10 in accordance with the present invention. As shown, the forward end 10F is cylindrically shaped while the aft end 10A takes an annular sector shape. Dash-line arc "C" depicts a portion of the circumference around the gas turbine major axis. In combustion systems of the cannular type, a plurality of transition duct members (such as the transition ducts 10) are arrayed circumferentially about the turbine major axis, and the downstream terminus of each extends circumferentially for an angle equal to 360° divided by N, where N is the particular number of transition duct member employed, usually 8 to 12. The N transition members together with suitable sealing means (not shown) between adjacent ducts form a 360° annulus discharging into a nozzle ring assembly indicated (in part) as 16 of FIG. 1.

For FIG. 5, coordinate system shown in FIG. 1 is modified to reflect the perspective of FIG. 5. As indicated, the modified coordinate system 18' shows the radial direction to be vertical at the duct centerline 22 and the circumferential direction to be approximately horizontal, while the axial direction (not shown) is directed into the plane of the paper.

Returning to FIG. 1, the prior art aft supporting means 12 is comprised basically of one or more flat plate gussets 26 rigidly attached at one end to the outer wall of the transition duct 10, and at its other end to a plate element 27 which is attached using bolts 30 to the nozzle retaining ring member 28. In known designs the gussets 26 are welded approximately perpendicular to the duct wall and are then attached to other structural elements of the gas turbine by any number of available means. It is the gusset to duct wall joint and the high localized thermal and mechanical stresses at the ends of this joint which are the principle objectives of the present invention to eliminate.

As previously indicated, axial, radial, circumferential, and tortional support is required at the aft end of the transition duct, and to compliment these support directions the forward end must provide radial, circumferential, and $T_{ax}$ (tortional about axial) support. Prior art aft end supporting systems as described provide $T_{ax}$ (tortional about axial), $T_r$ (tortion about radial), and $T_c$ (tortional about circumferential) restraint. The consequence of the last restraint is non-compliance to the relative radial growths and the dimensional tolerances of the several interface features at the two ends of the transition duct.

In addition to the overall support system suitable flexible sealing means, shown generally at 32, complete the termination of the transition duct 10A to the turbine nozzle section of the gas turbine machine.

Referring now to FIG. 2, there is shown a fragmentary side-elevation of the aft portion of a transition duct member 10A, partly in section, showing an improved aft mounting system 12' according to the present invention. The aft mounting system 12' is comprised of a cylindrical joint member 34; a hinge joint assembly 36; an interconnecting shaped bracket 38, all of which are anchored to the nozzle retaining ring 28 via one or more bolts 30. The hollow cylindrical member 34 (hereinafter the cylinder 34) is truncated having one end shaped to meet the contours of transition duct wall surface to which it is welded. A full penetration weld is provided between the wall of the cylinder 34 and the wall of the transition duct 10A for the full 360° circumference as indicated by the weld beads 40' and 40".

Due to the prevalent heat transfer conditions surrounding the transition ducts, the cylinder wall temperature decreases quite rapidly (illustratively ranging from approximately 1300° F. at the duct wall-to-cylinder joint) to that of the surrounding air (about 650° F.). The thermal expansion difference between the hot duct wall and the relatively cool cylinder remote from the duct surface is absorbed by bending and hoop strains of the cylinder wall in the vicinity of the duct-to-cylinder joint and by bending and hoop strains in the wall over a region approximately two times the cylinder diameter. It is the widespread distribution of strain due to the temperature differences involved as well as the elimination of end effects of the far less compliant gusset to wall joint of known support systems described earlier that yield the much reduced peak stresses. The cylinder wall thickness "t" and the cylinder diameter "D" are selected to meet the thermal and mechanical stress limitations imposed by the properties of the available materials, the duct wall thickness t', the physical size of the transition duct, and the operating environment of the particular gas turbine. The other end of the cylinder remote from the duct wall includes a pair of cradle sections 42 into which are fitted and welded a pair of identical bosses 44. The pair of bosses 44 are best seen (via brief reference to FIG. 5) as being aligned along a hinge pin axis 46.

Because the temperature in the vicinity of the cradle sections 42 are very close to the surrounding air temperature, attachment from this portion of the cylinder to the first stage nozzle retaining ring is accomplished with little risk of thermal stress build-up.

Referring now to FIG. 3 there is shown a diagramatic plan view, partly in section, of the improved aft mounting system 12', and especially the details of the hinge joint assembly 36. The cylinder 34 is shown as formed into the pair of cradles 42 into which are welded the pair of bosses 44. A hinge pin bolt 48 passes (from left to right in FIG. 3) through a first bushing 50 inserted into the first boss 44; through a suitably sized cylindrical hole in the mounting bracket 38 and through a second bushing 50 inserted into the second boss 44. All parts are axially aligned with the hinge pin axis 46 and are retained via a nut 52. A pair of hardened washers 54 are positioned, shim-like, between the bracket 38 and each of the bosses 44. The contact areas of the washers with the bracket and boss faces constitute the principle friction faces due to torquing of the hinge pin bolt 48.

The hinge joint assembly 36, described above, provides the degree of freedom necessary to allow the relative forward end to aft end relative radial motion by eliminating the Tc restraint (tortional about the circumferential axis) on the transition duct.

Wear at the hinge joint is a potentially serious problem. There are two key features of the present invention which are directed to preventing a wear problem at the hinge joint. The first is the preloaded friction faces between the washers 54 and their adjacent parts. The hinge pin bolt 48 provides a preload by being stretched (torqued) a predetermined amount at assembly such that vibratory motion at the hinge is prevented while still allowing rotation due to relative radial growth between the forward and aft ends of the transition duct. The forces involved in this later motion are much larger than the non-steady forces and the accumulated movement due to the relative radial growth of the two ends of the transition duct is small resulting only from assembly tolerances and machine start-up and shutdown cycles.

The second feature is the bushings 50 which provide two benefits. First, they prevent direct shear load and wear from acting on the bolt 48 which is, due to the stretched state, already under considerable stress. Second, the bolt diameter and material can be selected to yield the most satisfactory load vs. elongation rate. In addition, the bushing 50 material is selected for suitable wear properties as is the material for the washers 54.

Referring now to FIG. 4, an alternate embodiment of the aft mounting system 12' is shown attached to the transition duct 10A. This modified aft mounting system 12" is comprised of an integral cylindrical joint member/transition duct wall element 56, hereinafter referred to as the integral cylinder 56. Whereas the cylinder joint member 34 shown in FIG. 2 was fabricated from a right circular cylinder of constant wall thickness "t" welded directly to the duct wall, the wall element 56 may be fabricated by casting, forging, or machining and has regions of various thicknesses. The integral cylinder 56, which includes an integral base portion 58, becomes an integral section of the transition duct wall when fully installed. The integral cylinder 56 has its footprint base portion 58 welded into the duct wall 10A as shown by the weld bead 60, and the thickness of the integral cylinder 56 is made equal to the thickness of the duct wall 10A at the welded joint. As illustrated, the thickness "t1" in the region of the weld bead 60 is of a first value, the thickness "t2" adjacent to the hinge joint assembly 36 is another value, and the thickness "t3" corresponding to the central region of the base portion 58 is yet another value. Also, these regions of different thicknesses are smoothly connected via tapers and fillets of desired configurations. This variable dimensioning serves two functions. First, the thicknesses are varied so as to minimize peak stress levels especially in the weld 60 itself. Second, the overall strength and rigidity of the integral cylinder 56 is raised by allowing greater thickness where required without excessive thermal stress build-up. The ultimate capabilities of this alternate embodiment are, in general, greater than those of the embodiment of FIG. 2, while the fabrication complexity and hence costs are increased.

To ease this fabrication complexity somewhat, a top portion 56T of the integral cylinder 5 may be fabricated as a separate entity and joined (by welding illustratively) to the base or bottom portion 56B previously described. Top portion 56T is configured similarly to the corresponding portion described in connection with the embodiment of FIG. 2.

The advantages of the two significant aspects of the present invention—the cylinder-to-duct wall joint; and the preloaded or dampened hinge joint between the transition duct and the first stage nozzle retaining ring—should readily be appreciated by those skilled in the art. While the two structural arrangements can be used separately, in the preferred embodiment the two structural arrangements complement each other to fully provide the significant benefits of the improved support system.

Although the invention has been described in terms of a preferred embodiment, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. A support system for attaching the aft end of a gas turbine combustion transition duct member to a functionally related structural member comprising:
   (a) a cylindrical shaped base member contoured to mate with the surface of said transition duct member and rigidly attached thereto;
   (b) a pivoting hinge assembly comprising:
      (i) boss means rigidly attached to said base member;
      (ii) a bracket having a first end adapted to be nested with said boss means and to be nested with said boss means and a second end adapted to be attached to said functionally related structural member;
      (iii) interconnecting means fitted through said boss and said bracket for retaining said boss means and said bracket in close cooperating relationship, and providing a pivot axis for enabling pivotal relative motion therebetween; and
      (iv) said interconnecting means being configured to apply a predetermined force between said boss means and said bracket to resist, in controlled part, said pivotal relative motion.

2. The support system of claim 1 wherein said interconnecting means includes a thorough bolt-retaining nut assembly to apply said pre-determined force by adjustably advancing said nut on said bolt.

3. The support in claim 1 wherein said base member is welded to the outer wall of the aft end of said transition piece.

4. The support of claim 1 wherein the gas turbine combustion system is of the cannular type having a plurality of transition duct members circumferentially arrayed about a major longitudinal axis and said support system comprises a like plurality of base members and pivoting hing assemblies to provide attachment of the aft end of each of said plurality of transition duct members to the structural member of the gas turbine.

5. The support system of claim 4 wherein each of said plurality of base members is welded to the radially outboard wall of the aft end of each of said circumferentially arrayed transition duct members.

6. An improved support system for the aft end of combustion transition ducts of a gas turbine comprising:
   (a) a cylindrically shaped base member contoured to mate with the radially outboard surface of the aft end of a transition duct member and being attached thereto;
   (b) a hinge assembly comprising:
      (i) at least one boss member rigidly attached to said base member;
      (ii) a bracket shaped to cooperatively nest with said at least one boss member at a first bracket end, and rigidly attached via a second bracket end to a selected supporting member within said gas turbine;
      (iii) interconnecting means fitted through said boss member and said bracket for retaining said boss member and said bracket in close cooperating nested relationship, and providing a pivot axis for enabling pivotal relative motion therebetween.
      (iv) said interconnecting means configured to apply a predetermined force between said boss member and said bracket to resist, in controlled part, said pivotal relative motion.

7. The improved support system of claim 6 having a pair of boss members aligned along said pivot axis and symmetrically attached to said base member, said bracket cooperatively nesting between said bosses.

8. The improved support system of claim 7 further comprising a pair of hardened washers positioned between said pair of bosses and said cooperatively nested bracket for providing wear-resistant surfaces therebetween.

9. The improved support system of claim 7 further comprising a pair of bushings axially positioned by and extending through said pair of bosses and extending into said bracket along said pivot axis for providing bearing surfaces for said pivotal action between said bracket and said bosses.

10. The improved support system of claim 9 further comprising a through bolt-retaining nut assembly along said pivot axis inside said bushings to apply said predetermined force by adjustably advancing said nut on said bolt.

11. The improved support of claim 6 wherein said pivotal action permits relative movement between said transition duct member and said selected support member about a desired direction only.

12. The improved support system of claim 6 wherein said base member is cylindrically shaped to permit a continuous, circular weld joint between the transition duct wall and said base member to minimize stress concentrations and to eliminate end effects in said weld joint.

13. The improved support system of claim 12 wherein the cylinder is of selected wall thickness to minimize thermal and mechanical stresses in the cylinder to said duct wall weld joint as well as in the duct wall and cylinder wall in the vicinity of said weld joint.

14. The improved support system of claim 6 wherein the cylindrical member is fabricated integral with a contoured base member which duplicates a portion of the duct wall and replaces said duct wall portion when welded to the remainder of said duct wall.

15. The improved support system of claim 14 wherein the fabricated integral cylinder and base member are varied in thickness from one region to another via smooth tapers and interconnecting radii to minimize thermal and mechanical stresses while maximizing mechanical stiffness.

16. The improved support system of claim 14 wherein a portion of the cylinder away from the integral base is fabricated separately and then joined to said base member for supporting said bosses and said pivoting hinge assembly.

17. The improved support system of claim 6 wherein said base member is fabricated to include regions of various thicknesses.

18. The improved support system of claim 7 wherein said base member includes a first base portion attached to the outer surface of the duct member and a second top portion joined to said base portion for supporting said pivoting hinge assembly.

* * * * *